United States Patent Office 3,565,823
Patented Feb. 23, 1971

3,565,823

CATALYTIC DISPERSIONS OF METAL HALIDES IN MOLTEN TRIHALOSTANNATE(II) AND TRIHALOGERMANATE(II) SALTS

George William Parshall, Wilmington, Del., assignor to E. I. du Pont de Nemours and Company, Wilmington, Del., a corporation of Delaware No Drawing. Filed May 8, 1968, Ser. No. 727,710
Int. Cl. C07c 5/02, 5/22, 45/02
U.S. Cl. 252—429 9 Claims

ABSTRACT OF THE DISCLOSURE

Dispersions of transition and other metal halides in molten tetrahydrocarbylammonium or phosphonium trihalostannate(II) and trihalogermanate(II) salts are prepared by mixing a metal halide with a molten trihalostannate or trihalogermanate salt. The dispersions are useful as catalysts for the hydrogenation, isomerization or carbonylation of olefins and as colored inks for printing.

BACKGROUND OF THE INVENTION

(1) Field of the invention

This invention relates to novel dispersions of metal halides in molten quaternary ammonium trihalostannate-(II) or trihalogermanate(II) salts and to the processes for hydrogenating, isomerizing and carbonylating olefins in the presence of these dispersions as catalysts.

(2) Description of the prior art

It is known that simple solutions of platinum chloride and tin chloride in organic solvents can be used as hydrogenation catalysts. The present dispersions are markedly different from the prior art solutions. For example, the dispersions are stable in the presence of hydrogen at high pressures at temperatures up to 200° C. This stability in the presence of hydrogen at high temperature is highly desirable since the hydrogenation of difficulty hydrogenated olefins can be conducted at high temperatures using these solutions as catalysts.

SUMMARY OF THE INVENTION

This invention is directed to liquid dispersions, including molecular dispersions, consisting essentially of: (A) at least 0.05 weight percent of a chloride-, bromide- or iodide-containing salt of a metal having an atomic number of 22–28, 40–46, or 72–79; and (B) a molten salt of a compound of the formula $[R^1R^2R^3R^4Q]YX_3$ wherein $R^1$, $R^2$ $R^3$ and $R^4$, independently, contain up to 18 carbons and are alkyl, cycloalkyl, aryl, alkaryl or aralkyl; $R^1$ and $R^2$, conjointly, contain 4 to 6 carbons and is alkylene; $R^1$, $R^2$, $R^3$ and Q conjointly is pyridinium or quinolinium; Q is nitrogen or phosphorus; Y is tin or germanium; and X is chlorine or bromine. The dispersions are formed by mixing components A and B at a temperature above the melting point of component B.

The dispersions of this invention serve as catalysts in a process for the hydrogenation of olefins, in a process for the carbonylation of olefins and in a process for the isomerization of olefins.

The process for the hydrogenation of olefins is conducted by heating a mixture of hydrogen and an olefin, including a cycloolefin, in the presence of a catalytically effective amount of a metal halide-trihalostannate(II) or -trihalogermanate(II) dispersion wherein said metal is of atomic number 26–28, 44–46 or 76–78 at a temperature of at least the melting point temperature of said dispersion.

The process for the carbonylation of olefins is conducted by heating a mixture of carbon monoxide, hydrogen and an olefin in the presence of a catalytically effective amount of a metal halide-trihalostannate(II) or -trihalogermanate(II) dispersion of this invention wherein said metal is of atomic number 26–28, 44–46 or 76–78 at a temperature of at least the melting point tempearture of said dispersion.

The process for the isomerization of olefins is conducted by heating an ethylenically unsaturated olefin with a catalytically effective amount of a metal halide-trihalostannate(II) or -trihalogermanate(II) dispersion of this invention at a temperature of at least the melting point of said dispersion.

The products of the hydrogenation process are useful as intermediates or precursors leading to plastics. For example, the hydrogenation of cyclododecatriene gives cyclododecene which can be oxidized to dodecanedioic acid useful as a component of fiber-forming polyamides. The dispersions of this invention are also useful as catalysts for isomerization and carbonylation processes. Additionally, the dispersions are useful as colored inks for printing.

DESCRIPTION OF THE PREFERRED EMBODIMENTS

Component B of the dispersions of this invention consists of one or more quaternary tetrahydrocarbylammonium salts of trihalostannate(II) and trihalogermanate(II) anions. Quaternary ammonium trihalostannate(II) and trihalogermanate(II) are also known as quaternary ammonium trihalostannite and trihalogermanite, respectively. The tin and germanium moieties of these anions are in the +2 oxidation state. The melting points of the quaternary ammonium salts or mixtures thereof encompassed by Formula I, in general, range from below about 25° C. to about 350° C.

The dispersions of this invention are prepared by mixing a metal halide (component A) with a molten quaternary ammonium trihalostannate(II) or trihalogermanate (II) salt (component B). The solubility of the metal halide varies from less than 0.1% to 3%, by weight, or more. The solubility of the metal halide component varies with temperature. As temperatures are increased, the solubility of the metal halide is increased. The dispersions contain at least 0.05 percent, by weight, of the metal halide. Preferably, the dispersions contain 0.1 to 3%, by weight, of the metal halide, however, the dispersions can contain up to 10%, by weight, or more of the metal halide.

The upper stability limit of the solutions is in the temperature range of about 250–350° C. Mixtures of different quaternary ammonium trihalostannate(II) or trihalogermanate(II) salts have melting points which are depressed to a lower temperature than either of the individual quaternary ammonium salts.

The dispersions are prepared by mixing, e.g., stirring a mixture of the metal halide (component A) and a molten tetrahydrocarbylammonium trihalostannate(II) or trihalogermanate(II) salt (component B), preferably under an inert gas such as nitrogen, argon, helium and the like. Except for maintaining the mixing temperature above the melting point of component B, the mixing or reaction conditions for preparing the dispersions are not critical. The metal halide can be dispersed rapidly in the molten salt, e.g., within a few minutes with moderate stirring. The sequence of addition is not critical. Pressure is not critical. The dispersions can be prepared at atmospheric, subatmospheric or superatmospheric pressure but it is convenient to use atmospheric pressure. The dispersions can be prepared in glass or corrosion-resistant metal equipment.

The tetrahydrocarbylammonium and tetrahydrocarbylphosphonium trihalostannate(II) and trihalogermanate- (II) salts can be prepared by the method described by F. N. Jones, J. Org. Chem., 32, 1667 (1967). In this method the product is formed by the metathetical reaction between the following reactants: tetrahydrocarbylammonium chloride and $SnCl_2$ or $GeCl_2$ in dilute hydrochloric acid; tetrahydrocarbylphosphonium chloride and $SnCl_2$ or $GeCl_2$ in dilute hydrochloric acid; tetrahydrocarbylammonium bromide and $SnBr_2$ or $GeBr_2$ in dilute hydrobromic acid; and tetrahydrocarbylphosphonium bromide and $SnBr_2$ or $GeBr_2$ in dilute hydrobromic acid. Hydrocarbyl is a group formed by the removal of hydrogen atoms from a hydrocarbon. Within the definition of hydrocarbyl are alkylene groups formed by the removal of two or three hydrogens from different carbons of a hydrocarbon. Included in the definition of hydrocarbyl are substituents having up to 18 carbons; for example, alkyl, such as: methyl, ethyl, propyl, butyl, hexyl, heptyl, octyl, decyl, undecyl, dodecyl, tetradecyl, hexadecyl, octadecyl, and the like; cycloalkyl, such as: cyclobutyl, cyclopentyl, cyclohexyl, methylcyclopentyl, methylcyclohexyl, ethylcyclohexyl, dodecylcyclohexyl, cycloheptyl, cyclooctyl, cyclododecyl and the like; aryl, such as: phenyl, α-naphthyl, β-naphthyl and the like; aralkyl such as: tolyl, xylyl, mesitylyl, ethylphenyl, hexylphenyl, dodecylphenyl, methylnaphthyl and the like; aralkyl, such as: benzyl, β-phenylethyl, α-phenylethyl, naphthylmethyl, β-phenylpropyl and the like; alkylene such as butylene, pentylene, hexylene, 1,4-pentylene, 1,5-hexylene, 1,5-heptylene and the like.

Examples of quaternary ammonium and phosphonium cations of component B of this invention are: trimethyloctyldecyl-, (3,3-diphenylpropyl)methyldipropyl-, amyltributyl-, benzyldimethyloctadecyl-, 4-biphenylyldiethylmethyl, sec-butylcyclohexyldimethyl-, dibutyldioctadecyl-, dimethyloctadecylphenyl-, diethylmethyl(naphthylmethyl)-, 9-fluorenyltrimethyl-, tetrahexadecylammonium, 1-octadecylpyridinium, 1-methyl-1-(naphthylmethyl)piperidinium and tetraphenyl-, benzyltriphenyl-, dodecyltriethyl- and dodecyltri-p-tolylphosphonium cations. Trihalostannate(II) or trihalogermanate(II) salts are prepared by reacting $SnCl_2$, $SnBr_2$, $GeCl_2$ or $GeBr_2$ in the hydrohalic acid corresponding to the halide moiety of the tin or germanium halide used with a quaternary ammonium halide. The melting points of some of these salts are given below.

| Compound: | Melting point, ° C. |
|---|---|
| $(CH_3)_4NSnCl_3$ | 346 |
| $(C_2H_5)_4NSnCl_3$ | 78–79 |
| $(n\text{-}C_4H_9)_4NSnCl_3$ | 58–59 |
| $CH_3(C_6H_5)_3PSnBr_3$ | 113–114 |
| $(C_2H_5)_4NGeCl_3$ | 68.5–70 |

The metal halides (component A) used to form the dispersions of this invention are selected from the group consisting of chloride, bromide, and iodide of a metal selected from the group consisting of Ti, V, Cr, Mn, Fe, Co, Ni, Zr, Nb, Mo, Tc, Ru, Rh, Pd, Hf, Ta, W, Re, Os, Ir, Pt and Au. These halides are of the formulae $$M'_{n-v}MX'_n \text{ or } MX'_yLL'$$

wherein M is a Group IV–B, V–B, VI–B, VII–B, VIII–B metal or gold; M′ is an alkali metal, i.e., lithium, sodium, potassium, rubidium or cesium; *n*, the coordination number of M, is 2, 4 or 6; *v*, the positive valence of M, is 2, 3, 4, 5 or 6; X′ is chlorine, bromine or iodine; *y* is the positive valence of M and is 2 or 3; L and L′ are ligands selected from the group consisting of

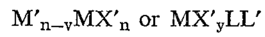

$R^5R^6R^7As$, $R^5R^6S$ and NO wherein $R^5$, $R^6$ and $R^7$ are alkyl of up to 6 carbons, aryl of up to 10 carbon atoms, aralkyl of up to 10 carbons and alkaryl of up to 10 carbons. These metal halides have been reported in Cotton and Wilkinson, Advanced Inorganic Chemistry, Interscience Publishers, John Wiley and Sons, New York, 1966.

It is believed that a rection occurs between component A and component B since the dispersions are colored. Reaction between the compounds can produce complex compounds containing various amounts of the gold or transitional metal and tin or germanium. In these compounds, complex bonding of the type $MSnX_3$ or $MGeX_3$ can occur.

The dispersions of this invention are essentially nonaqueous. However, some water can be introduced when the metal halide used is a hydrate such as $RuCl_3$ hydrate or $IrCl_3 \cdot 4H_2O$. The amount of water present in the resulting dispersion is not greater than 1.5%, by weight.

The dispersions of this invention include molecular dispersions, i.e., solutions, of a metal halide (component A) in a molten trihalostannate(II) or trihalogermanate(II) salt or mixture thereof (component B). In some cases, the mixture consists of colloidal metal halide dispersed in a solution of the metal halide.

The following examples further illustrate the invention.

EXAMPLE I

In a glass flask, 0.3 g. of $PtCL_2$ was mixed with 26 g. of molten N,N,N,N-tetraethylammonium trichlorostannate(II) at 90–100° C. A bright red dispersion was obtained. The solution was cooled as low as 70° C. without the formation of crystals in the solution. Vinyl chloride dissolved readily in this solution and was recovered unchanged by reducing the pressure in the system.

In the following Examples, II to VII, 0.05 g. of transition metal chlorides listed in the middle column of the table below was added to 5 g. of molten $(C_2H_5)_4NSnCl_3$ heated to a temperature of 113° C. under nitrogen. In Examples III–VI, part of the transition metal salt remained undissolved, indicating that the solubility was less than 1%. However, in all instances, some dissolved and, with $PdCl_2$ and $ReCl_3$, almost complete solution occured to give a liquid having the color listed in the right-hand column.

| | Transition metal halide | Color of dispersion |
|---|---|---|
| Example: | | |
| II | $PdCl_2$ | Deep red. |
| III | $RuCl_3$ hydrate | Light orange. |
| IV | $RhCl_3$ hydrate | Dark brown. |
| V | $IrCl_3 \cdot 4H_2O$ | Orange. |
| VI | $OsCl_3$ | Brown-black. |
| VII | $ReCl_3$ | Deep red. |

In the following Examples VIII to XXV, 0.01–0.1 g. of the transition metal halide listed in the column labeled metal halide was dissolved in 3 g. of molten N,N,N,N-$(C_2H_5)_4NSnCl_3$ heated to the temperature indicated. Solutions having colors indicated in the far right-hand column were obtained. Temperatures in Examples VIII to XXV are in degrees centigrade.

| | Metal halide | Temp. | Color of solution |
|---|---|---|---|
| Example: | | | |
| VIII | $CoCl_2$ | 125 | Deep blue. |
| IX | $CoCl_2 \cdot 6H_2O$ | 100 | Do. |
| X | $H_2PtCl_6 \cdot nH_2O$ | 100 | Red. |
| XI | $FeCl_2$ | 100 | Brown. |
| XII | $FeCl_3$ | 100 | Do. |
| XIII | $MnCl_2$ | 150 | Yellow. |
| XIV | $CrCl_2$ | 100 | Grey-green. |
| XV | $CrCl_3$ | 125 | Green. |
| XVI | $VCl_3$ | 120 | Do. |
| XVII | $TiCl_3$ | 112 | Brown. |
| XVIII | $NiCl_2$ | 100 | Light blue-green. |
| XIX | $NiBr_2$ | 100 | Do. |
| XX | $NiI_2 \cdot 6H_2O$ | 200 | Bright green. |
| XXI | $IrBr_3$ | 200 | Yellow-brown. |
| XXII | $K_2PtCl_4$ | 90 | Bright red. |
| XXIII | $K_2PdCl_4$ | 200 | Orange-tan. |
| XXIV | $WCl_6$ | 150 | Blue. |
| XXV | $MoCl_3$ | 200 | Brown. |

In addition to these simple binary halides and complex salts, solutions of metal complexes bearing other ligands in molten $(C_2H_5)_4NSnCl_3$ can be prepared by mixing 0.05 g. of the metal complex listed below in Examples XXVI and XXVII to 5.0 g. of molten $(C_2H_5)_4NSnCl_3$ at the indicated temperature to give red solutions. Temperatures in Examples XXVI and XXVII are in degrees centigrade.

| | Metal halide (A is $MX_1yLL_1$) | Temp. | Color of solution |
|---|---|---|---|
| Example: | | | |
| XXVI | trans-$(Et_3P)_2PtCl_2$ | 100 | Red. |
| XXVII | $(NO)RuCl_3 \cdot 3H_2O$ | 90 | Do. |

In the procedures of Examples XVI and XXVII the metal halides $[(C_6H_5)_3As]_2PdCl_2$ and $[(C_6H_5)_2S]_2PtCl_2$ can be used to obtain highly colored solutions of this invention.

In Examples XXVIII to XXXII, 2 mg. of the transition metal compound listed dissolved partially, i.e., $RhCl_3$ and $RuCl_3$, or completely in 200 mg. of molten $$(C_2H_5)_4NGeCl_3$$

heated at 120° C.

| | Metal halide | Color of solution |
|---|---|---|
| Example: | | |
| XXVIII | $NiBr_2 \cdot 6H_2O$ | Green. |
| XXIX | $CoCl_2$ | Yellow. |
| XXX | $PdCl_2$ | Red. |
| XXXI | $RuCl_3 \cdot 3H_2O$ | Do. |
| XXXII | $RhCl_3 \cdot 3H_2O$ | Yellow. |

EXAMPLE XXXIII

Platinum dichloride (20 mg.) dissolved readily in 400 mg. of molten tetraethylammonium trichlorogermanate-(II) heated at 100° C. to give a red solution.

EXAMPLE XXXIV

Platinum dichloride (20 mg.) dissolved in 400 mg. of molten methyltriphenylphosphonium tribromostannate(II) heated at 120° C. to give a red-violet solution.

EXAMPLE XXXV

A mixture of 0.3 g. $AuCl_3$ and 13 g. of molten $(C_2H_5)_4NSnCl_3$ was melted under vacuum. The gold chloride dissolved to give a deep red-violet solution.

All the solutions of this invention are colored and are useful as colored inks and as colored coatings for glass.

The following example further illustrates the utility of all of the dispersions of this invention as colored inks and as colored coatings for glass.

EXAMPLE A

A light blue green dispersion of anhydrous $NiBr_2$ in molten $(C_2H_5)_4NsnCl_3$ was painted on glass to give an adherent, light green film. The dispersion was also applied to paper with a hot pipette to give pale green, adherent writing. Inks and coatings of other colors are obtained by dissolving gold or a transition metal halide in a tetraalkylammonium trichlorostannate(II) salt. Examples of other colored inks obtained from $(C_2H_5)_4NSnCl_3$ dispersions were:

| | |
|---|---|
| $CoCl_2$ | Blue |
| $PdCl_2$ | Red |
| $PtCl_2$ | Red |
| $RhCl_3$ | Brown |
| $OsCl_3$ | Black |
| $NiI_2 \cdot 6H_2O$ | Yellow |

The following examples illustrate the catalytic activity of the dispersions of the metal salts in tetraalkylammonium trihalostannate(II) and trihalogermanate(II) salts.

EXAMPLE XXXVI

A mixture of 25 g. of tetraethylammonium trichlorostannate(II) and 0.3 g. of platinum dichloride was melted under vacuum to give a clear, dark-red solution. Hydrogen was added to a pressure of 380 mm. and ethylene was then added to bring the pressure to 760 mm. A moderately rapid pressure decrease occurred as the mixture was stirred at 95° C. After two hours about 75% of the ethylene had been hydrogenated to ethane. The infrared spectrum showed only absorption assignable to ethane and ethylene.

EXAMPLE XXXVII

The solution of $PtCl_2$ in molten tetraethylammonium trichlorostannate(II) of Example I was stirred at 90° C. while an equimolar mixture of ethylene and hydrogen was bubbled in over a period of 3 hours at a rate of 4 ml. per minute. The gaseous products were collected in a glass trap maintained at −196° C. The infrared spectrum of the gases which were collected showed the presence of roughly equal amounts of ethane and ethylene.

EXAMPLE XXXVIII

A mixture of 44 g. of tetra-n-butylammonium trichlorostannate(II) and 0.45 g. of platinum dichloride, $PtCl_2$, was melted under nitrogen in a glass pressure bottle. The $PtCl_2$ dissolved readily at 70° C. to give a bright red syrup which could be cooled well below the melting point of the tetra-n-butylammoniumtrichlorostannate(II) without solidification. The bottle was evacuated and pressured to 29 p.s.i.g. with a 1:1 mixture of ethylene and hydrogen. The mixture was stirred at 70° C. for 6 hours. Gas chromatographic analysis of the gaseous product showed ethane and ethylene in a ratio of about 6:1.

EXAMPLE XXXIX

A mixture of 0.54 g. of 1,5-cyclooctadiene and 26 g. of a 1.1%, by weight, dispersion of $PtCl_2$ in molten tetraethylammonium trichlorostannate(II) was stirred at about 100° C. under a pressure of 730 mm. of hydrogen for 17.3 hours. The liquid product was distilled from the molten solution. Gas chromatographic analysis of the distillate showed 0.6% cyclooctane, 2.6% cyclooctene, and 95.2% 1,3-cyclooctadiene. This result demonstrates the activity of the $PtCl_2$ tetraethyl-ammonium trichlorostannate(II) solution as a catalyst for the isomerization and hydrogenation of 1,5-cyclooctadiene.

EXAMPLE XL

A mixture of 5 ml. of cis-, trans-, trans-1,5,9-cyclododecatriene and 54 g. of a 1.1%, by weight, dispersion of $PtCl_2$ in tetraethylammonium trichlorostannate was agitated in a metal reactor at 100° C. for 6 hours under a pressure of 100 atm. of hydrogen. The crude product was extracted with benzene and the benzene extract was distilled. After removal of the benzene, 3.23 g. of colorless liquid distilled at 58° C. at 1.1 mm. Gas chromatographic analysis of this liquid showed that about 15–20% reduction of the cyclododecatriene had occurred. Of the reduced products, about 80% was a mixture of cis- and trans-cyclododecene and 15% was a mixture of cyclododecadienes. A small amount of cyclododecane was also obtained.

EXAMPLE XLI

A mixture of 5.0 g. of 1,5,9 - cyclododecatriene and 54 g. of a 1%, by weight, dispersion of $PtCl_2$ in molten tetraethylammonium trichlorostannate(II) was agitated at 160° C. for 8 hours under a pressure of 100 atm. of hydrogen. The product was isolated by extraction as in Example XL. The gas chromatogram showed little unchanged cyclododecatriene and little or no cyclododecane. The main product (87%) was a mixture of cis- and trans-cyclododecene together with minor amounts of cyclododecadienes.

EXAMPLE XLII

A mixture of 5.0 ml. of 1,5,9 - cyclododecatriene and 46 g. of a 1% solution of $PtCl_2$ in molten tetraethylammonium trichlorostannate(II) was agitated at 140° C. for 6 hours under a pressure of 500 atm. of hydrogen. Isolation of the product as in Example XL showed 73% of a mixture of cis- and trans-cyclodecene, 18% cyclododecadienes, 15% cyclododecatriene and 4% cyclododecane.

EXAMPLE XLIII

A mixture of 5.0 ml. of 1,5,9 - cyclododecatriene and 50 g. of a 1% solution of platinum dichloride in molten tetraethylammonium trichlorostannate(II) was agitated at 140° C. for 6 hours under a pressure of 30 atmospheres of hydrogen. Isolation of the products as in Example XL gave 2.3 g. of a mixture containing mostly cis-cyclododecene.

EXAMPLE XLIV

A mixture of 5.0 g. of trans-, trans-, trans-1,5,9-cyclododecatriene and 50 g. of a 1%, by weight, dispersion of $PtCl_2$ in molten tetraethylammonium trichlorostannate (II) was agitated at 150° C. for 8 hours under a pressure of 100 atm. of hydrogen. Isolation of products as in Example XL gave 4.13 g. of a liquid which contained mostly cis-cyclododecene and very little unchanged cyclododecatriene.

EXAMPLE XLV

A dispersion of 0.6 g. of platinum dichloride in 51 g. of tetraethylammonium trichlorostannate(II) was placed in a glass-lined 400 ml. pressure vessel. The vessel was pressurized to 1000 atm. with a 1:2:10 mixture of hydrogen, ethylene, and carbon monoxide and was agitated at 90° C. for 6 hours. The volatile products were fractionated by vacuum distillation. The product retained by a trap cooled to —119° C. was propionaldehyde. Treatment with 2,4 - dinitrophenylhydrazine gave a yellow-orange product. Recrystallization from ethanol gave orange needles of the 2,4 - dinitrophenylhydrazone of propionaldehyde, melting point 154–156° C. A mixture melting point with an authentic sample was not depressed. Vacuum distillation of the residual liquid clinging to the frozen salt in the pressure vessel gave 2.8 g. of clear colorless liquid. Gas chromatographic analysis showed the presence of propionaldehyde and 2-methyl-2-pentenal.

EXAMPLE XLVI

A dispersion of 0.5 g. of $Na_3RhCl_6$ in 39.3 g. of tetraethylammonium trichlorostannate(II) was heated in a glass-lined pressure vessel at 90° C. for 6 hours under a pressure of 1000 atm. of a 1:2:10 mixture of hydrogen, ethylene, and carbon monoxide. Vacuum distillation of the volatile products showed the presence of propionaldehyde which was identified by its infrared spectrum and gas chromotography.

EXAMPLE XLVII

A mixture of 45 g. of a 1%, by weight, dispersion of platinum dichloride in tetra-n-butylammonium trichlorostannate(II) and 17 g. of a 1%, by weight, dispersion of $PtCl_2$ in molten tetraethylammonium trichlorostannate-(II) was melted at 100° C. in a glass pressure bottle under nitrogen. The bottle was cooled to 53° C. and pressured to 29 p.s.i.g. with an equimolar mixture of ethylene and hydrogen. The melt was stirred at 53° C. for five hours and was cooled to room temperature. Gas chromatography showed the gas to contain ethane and ethylene in a 2:3 ratio.

The metal halide-trihalostannate(II) or -trihalogermanate(II) dispersions of this invention are useful as catalysts for processes of hydrogenation, isomerization and carbonylation or olefins.

In these processes an effective catalytic amount of a dispersion of this invention or mixtures thereof is used. In general, an effective catalytic amount will be dependent upon the conditions, the reactants, the particular process and metal halide dispersion. Preferably, 0.05 to 10 weight percent of the dispersion based on the olefin reactant is used. Most preferably, 0.5 to 5 weight percent of the dispersion is used.

The olefin and cycloolefin reactants of these processes are of the formula

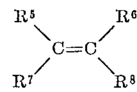

wherein $R^5$, $R^6$, $R^7$, and $R^8$, individually, are hydrogen, alkyl of up to 12 carbons, alkenyl of up to 12 carbons, aryl of up to 10 carbons, aralkyl of up to 10 carbons, alkaryl of up to 10 carbons, aralkenyl of up to 10 carbons, —$COOR^9$, or $COR^9$ where $R^9$ is lower alkyl; $R^5$ and $R^7$ conjointly is alkylene or alkenylene of 4 to 6 carbons; and $R^5$ and $R^6$ is alkylene or alkenylene of up to 10 carbons or the divalent radical of the formula:

$$-(CH_2)-CH=CH-(CH_2)_2-CH=CH-(CH_2)_2-$$

with the proviso that at least two of $R^5$, $R^6$, $R^7$ and $R^8$ are hydrogen. Included within the definition of the olefin is 1,5 - cyclododecadiene and 1,5,9 - cyclododecatriene.

The rates of reaction of the processes are dependent upon the temperature and the reactants used. In general, the temperature of reaction will be as low as about 10° C. and up to 350° C.

Pressure reactors may be necessary for the processes to effect reaction. In general, the pressure will be autogenous pressures to 1500 atmospheres or higher.

The time of reaction will vary from a very short time of a few minutes or less to a few hours or longer. Shorter reaction times are preferred since they give more economical processes.

Isomerization of the olefin or of the product can occur during the hydrogenation or carbonylation processes. The isomerization is of two types: (1) isomerization of a cis isomer of an olefin to the more thermodynamically stable trans isomer and (2) position isomerization of an olefin, such as isomerization of an olefin to a different structure. An example of the latter type of isomerization is the conversion of $\alpha$-pinene to $\alpha$-terpinene, dipentene or $\gamma$-terpinene. Isomerization of some olefins such as ethylene and propylene occur but the fact that isomerization has occurred is not detectable except in ethylene and propylene containing some deuterium instead of hydrogen.

The hydrogenated, carbonylated or isomerized product can be isolated by distillation of the reaction mixture. Alternatively, the crude reaction mixture can be isolated by first washing with water followed by separating of the hydrocarbon layer from the water layer. Pure product is then obtained by distillation.

The compounds produced by the hydrogenation process are useful as solvents and as chemical intermediates, such as precursors of fiber-forming polyamides. For example, 1,5,9-cyclododecatriene can be hydrogenated to cyclododecene which can be oxidized with dilute potassium permanganate to dodecanedioic acid. Dodecanedioic acid reacts with diamines such as hexamethylenediamine to form a salt which can be heated under vacuum at a temperature of about 200° C. to form a fiber-forming polyamide. Fibers can be prepared from the polyamide by melt spinning.

The aldehydes produced in the carbonylation process are useful as solvents and as commercially important intermediates. For example, propionaldehyde is used in the production of polyvinyl acetals which are useful as adhesives and for the production of rubber chemicals. Turner, The Condensed Chemical Dictionary, Reinhold Publications, New York, 1950, p. 547.

The products from the isomerization process are useful as solvents for lacquers and paints.

The foregoing detailed description has been given for clarity of understanding only and no unnecessary limitations are to be understood therefrom, for obvious modifications will occur to those skilled in the art.

The embodiments of the invention in which an exclusive property or privilege is claimed are defined as follows:

1. A dispersion consisting essentially of:

(A) at least 0.05 weight percent of a compound of the formula $$M'_{n-v}MX'_n \text{ or } MX'_yLL'$$

wherein M is a metal having an atomic number of 22–28, 40–46 or 72–79; M' is lithium, sodium, potassium, rubidium or cesium; *n* is 2, 4 or 6; *v* is 2, 3, 4, 5 or 6; X' is chlorine, bromine or iodine; *y* is 2 or 3; L and L' are ligands selected from the group consisting of $R^5R^6R^7P$, $R^5R^6R^7As$, $R^5R^6S$, and NO wherein $R^5$, $R^6$ and $R^7$, independently are alkyl of up to 6 carbons, aryl of up to 10 carbons, aralkyl of up to 10 carbons or alkaryl of up to 10 carbons; and (B) a molten salt of the formula $$[R^1R^2R^3R^4Q]YX_3$$

wherein $R^1$, $R^2$, $R^3$ and $R^4$, independently, contain up to 18 carbons and are alkyl, cycloalkyl, aryl, alkaryl or aralkyl; $R^1$, $R^2$, and Q conjointly form the piperidinium nucleus; $R^1$, $R^2$, $R^3$ and Q conjointly form the pyridinium or quinolinium nuclei; Q is nitrogen or phosphorus; Y is tin or germanium; and X is chlorine or bromine.

2. A disperson of claim 1 wherein the compound defined in section (A) is $PtCl_2$.

3. A dispersion of claim 1 wherein the compound defined in section (A) is $PdCl_2$.

4. A dispersion of claim 1 wherein the compound defined in section (A) is $IrCl_3$.

5. A dispersion of claim 1 wherein the metal halide is $Na_3RhCl_6$.

6. A dispersion of claim 1 wherein the molten salt is N,N,N,N - tetraethylammonium trichlorostannate(II) heated at least to its melting point temperature.

7. A dispersion of claim 1 wherein the molten salt is N,N,N,N - tetra - n - butylammonium trichlorostannate(II) heated at least to its melting point temperature.

8. A dispersion of claim 1 wherein the molten salt is N,N,N,N - tetraethylammonium trichlorogermanate(II) heated at least to its melting point temperature.

9. The dispersion of claim 1 consisting of $PtCl_2$ dissolved in molten N,N,N,N-tetraethylammonium trichlorostanate(II).

References Cited

UNITED STATES PATENTS

| | | | |
|---|---|---|---|
| 2,930,785 | 3/1960 | Edmonds | 252—431(P)X |
| 3,208,986 | 9/1965 | Mazzanti et al. | 252—431(N)X |
| 3,458,547 | 7/1969 | Coffey | 252—431(N)X |

PATRICK P. GARVIN, Primary Examiner

U.S. Cl. X.R.

106—20; 252—431; 260—604, 683.2, 683.9